W. A. STOLLEY.
ARTIFICIAL BAIT.
APPLICATION FILED JAN. 22, 1917.
1,376,590. Patented May 3, 1921.
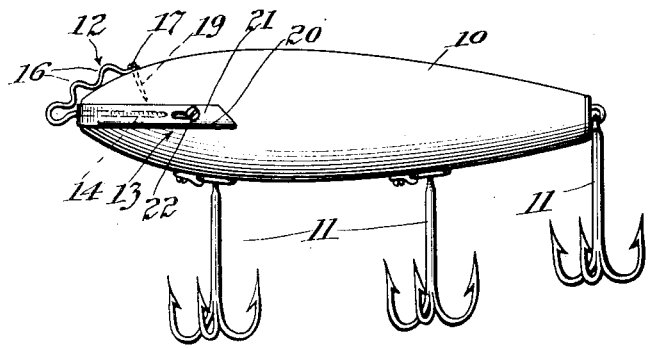
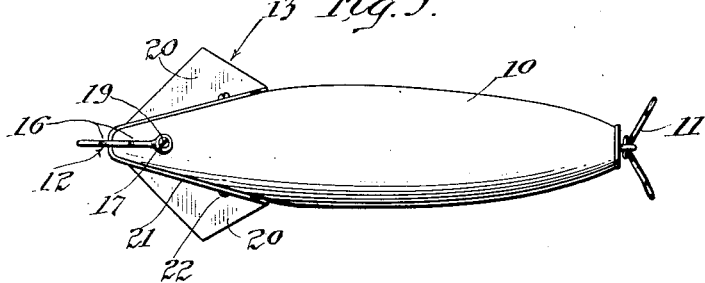
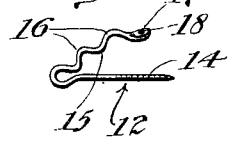

UNITED STATES PATENT OFFICE.

WILLIAM A. STOLLEY, OF DOWAGIAC, MICHIGAN, ASSIGNOR TO JAMES HEDDON'S SONS, INC., OF DOWAGIAC, MICHIGAN, A CORPORATION OF MICHIGAN.

ARTIFICIAL BAIT.

1,376,590.  Specification of Letters Patent.  Patented May 3, 1921.

Application filed January 22, 1917. Serial No. 143,592.

*To all whom it may concern:*

Be it known that I, WILLIAM A. STOLLEY, a citizen of the United States, residing at Dowagiac, in the county of Cass and State of Michigan, have invented new and useful Improvements in Artificial Baits, of which the following is a full, clear, concise, and exact description, reference being had to the accompanying drawing, forming a part of this specification.

My invention relates to artificial baits.

One of the objects of my invention is to provide an artificial bait with improved means whereby the line may be selectively attached at various points to vary the manner in which the bait will travel when drawn through the water.

In the drawings in which one embodiment of my invention is shown:

Figure 1 is a side elevation of an artificial bait equipped with my improved line fastening, Fig. 2 is a detail view of the fastening detached from the bait, and Fig. 3 is a plan view of the bait.

Referring now to the drawings in detail, the artificial bait shown comprises a body portion, 10, which may be of wood, a plurality of hooks 11, secured to the body 10, a line fastening 12 secured to the forward end of the body portion for the attachment of the line and a blade or fin member 13 also attached to the forward portion of the body 10 for controlling the movement of the bait in the water. The fastening member 12 is formed of a single integral piece of metal such as wire having a screw threaded portion 14 screwed into the body 10 and a crimped portion 15 to any one of the bends 16 of which the line may be fastened, the portion between the bend engaging the body portion of the bait to prevent the line from slipping from one bend to the other. The construction of this fastening member is such that it can readily be formed in a die, thereby insuring absolute uniformity in the location of the different points of the line attachment. The end of the crimped portion is flattened at 17 and this front portion is apertured at 18 to receive a screw 19 inserted into the body 10 for holding this end of the fastening in place.

The blade member 13 is formed of a single piece of sheet metal and comprises a pair of blades or fins 20 which cut the water as the bait is drawn therethrough, and an attaching flange 21 which lies against the body 10 and through which screws 22 extend into the body for securing the blade in position.

In use, the line may be secured to any one of the bends or loops 16 of the crimped portion 15. A change in the fastening of the line with respect to the blade 13 and body 10 changes the manner in which the bait travels through the water.

When the bait is drawn through the water by reeling in the line, it dives and darts rapidly first to one side and then to the other simulating the motion of a swimming fish. The farther back the line is fastened the greater will be the diving and sidewise darting movement of the bait.

The crimped portion 15 of the line fastening is so formed relative to the shank portion that the body portion 10 of the bait will not interfere with the movement of the crimped portion, as the shank portion is screwed into the body of the bait.

Having described my invention, what I claim as new and desire to secure by Letters Patent, is:—

1. An artificial bait comprising an elongated body portion having a tapering front portion substantially circular in cross-section, a fish hook secured thereto, and a metallic line fastener to which the line is secured comprising an elongated one-piece member having a portion of sinuous form, having a plurality of crimped portions to any one of which the line may be fastened, said one-piece member also having a screw threaded shank portion which is screwed axially into said tapering front portion, said sinuous portion extending rearwardly and extending at such an angle with respect to said shank portion that said tapering front portion of the body will not interfere with the continuous portion of the shank as the shank is screwed into the body.

2. An artificial bait comprising an elongated body portion having a tapering front portion substantially circular in cross-section, a fish hook secured thereto, and a metallic line fastener to which the line is secured comprising an elongated one-piece member having a portion of sinuous form, having a plurality of crimped portions to any one of which the line may be fastened, said one-piece member also having a screw threaded shank portion which is screwed axially into said tapering front portion, said sinuous portion extending rearwardly and extending at such an angle with respect to said shank portion that said tapering front portion of the body will not interfere with the continuous portion of the shank as the shank is screwed into the body, the portion between said crimped portions lying adjacent said body portions to prevent the line from slipping from one crimped portion to the other.

In witness whereof I have hereunto subscribed my name.

WILLIAM A. STOLLEY.

Witnesses:
HELEN McKENZIE,
MABEL McKENZIE.